(12) United States Patent
Larsson et al.

(10) Patent No.: US 9,923,355 B2
(45) Date of Patent: Mar. 20, 2018

(54) TERMINATION OF STRENGTH MEMBERS OF DEEP WATER CABLES

(71) Applicant: NEXANS, Paris (FR)

(72) Inventors: Roger Larsson, Stromstad (SE); Jan Erik Karlsen, Kolbotn (NO); Bjorn Aspli, Halden (NO)

(73) Assignee: NEXANS, Paris (FR)

( * ) Notice: Subject to any disclaimer, the term of this patent is extended or adjusted under 35 U.S.C. 154(b) by 0 days.

(21) Appl. No.: 14/931,962

(22) Filed: Nov. 4, 2015

(65) Prior Publication Data
US 2016/0134095 A1    May 12, 2016

(30) Foreign Application Priority Data
Nov. 10, 2014   (EP) ..................... 14306795

(51) Int. Cl.
*B31F 1/00*    (2006.01)
*B29D 22/00*   (2006.01)
(Continued)

(52) U.S. Cl.
CPC ........... *H02G 15/06* (2013.01); *F16G 11/042* (2013.01); *F16G 11/05* (2013.01); *H02G 1/14* (2013.01);
(Continued)

(58) Field of Classification Search
CPC ....... B29C 65/00; B29C 65/48; B29C 65/483; B29C 66/00; B29C 66/05; B29C 66/303; B29C 66/30325; B29C 66/51; B29C 66/532; F16G 11/042; F16G 11/00; F16G 11/04; F16G 11/05; H02G 15/00; H02G 15/003; H02G 15/02; H02G 15/04; H02G 15/043; H02G 15/06; H02G 15/076; H02G 1/14; Y10T 24/3909; Y10T 29/49174; Y10T 29/49176
USPC ...... 156/47, 48, 51, 52, 60, 70, 88, 91, 166, 156/196, 199, 200, 201, 212, 213, 293, 156/294, 296, 330, 331.7; 174/19, 21 R, 174/73.1, 74 R, 75 R, 76, 77 R, 84 R, 87, 174/89, 91, 92
See application file for complete search history.

(56) References Cited

U.S. PATENT DOCUMENTS 1,857,436 A    5/1932   Cole
3,921,257 A   11/1975   Appleby et al.
(Continued)

FOREIGN PATENT DOCUMENTS

JP    2003070143    3/2003

OTHER PUBLICATIONS

Search Report dated 2015.

*Primary Examiner* — Philip Tucker
*Assistant Examiner* — Brian R Slawski
(74) *Attorney, Agent, or Firm* — Sofer & Haroun, LLP

(57) ABSTRACT

A method for terminating a cable (6) having at least one strength member (7). The method includes the steps of providing a cable termination comprising at least one termination chamber (2) for accommodating an end section of the strength member (7) and arranging and fastening an anchoring sleeve (12) around at least parts of the end section. The method further includes introducing the end section into the termination chamber (2) and fastening the end section by curing a polymer resin in the termination chamber (2) as well as a termination suitable for the method.

14 Claims, 5 Drawing Sheets

(51) Int. Cl.
*B29C 65/00* (2006.01)
*B32B 37/00* (2006.01)
*C09J 163/00* (2006.01)
*C09J 4/00* (2006.01)
*C09J 101/00* (2006.01)
*C09J 201/00* (2006.01)
*H02G 15/22* (2006.01)
*H02G 3/02* (2006.01)
*H02G 15/02* (2006.01)
*H02G 15/08* (2006.01)
*H02G 15/06* (2006.01)
*F16G 11/04* (2006.01)
*H02G 1/14* (2006.01)
*F16G 11/05* (2006.01)
*B29C 65/48* (2006.01)

(52) U.S. Cl.
CPC ...... *B29C 65/483* (2013.01); *B29C 66/30325* (2013.01); *B29C 66/532* (2013.01)

(56) References Cited

U.S. PATENT DOCUMENTS

| | | | |
|---|---|---|---|
| 5,611,636 A | 3/1997 | Flory | |
| 6,058,603 A * | 5/2000 | Reed | G02B 6/3887 174/84 R |
| 6,742,813 B1 * | 6/2004 | Glejbol | F16L 33/003 285/222.1 |
| 2015/0300452 A1 * | 10/2015 | Campbell | F16G 11/025 403/275 |

* cited by examiner

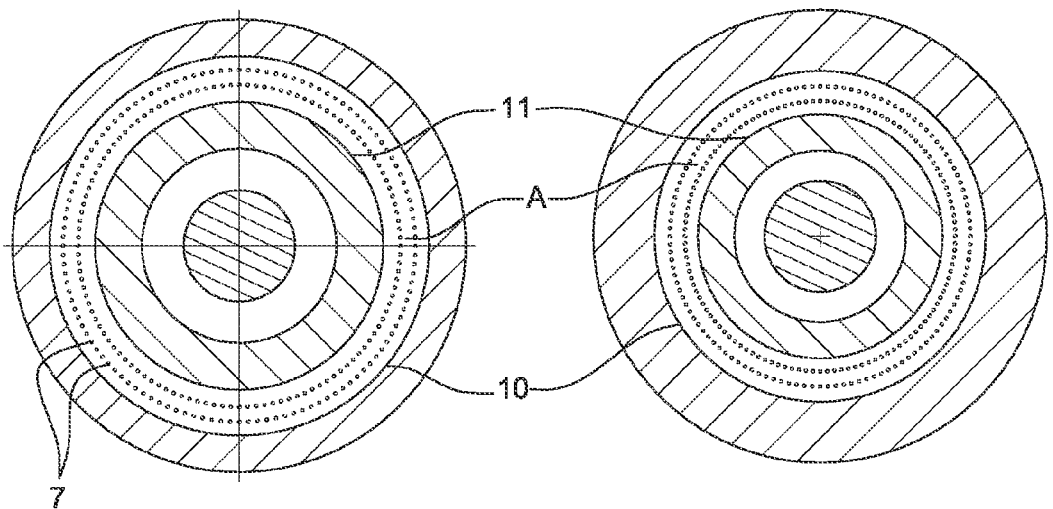
Fig. 2a(K-K)  Fig. 2b(H-H)
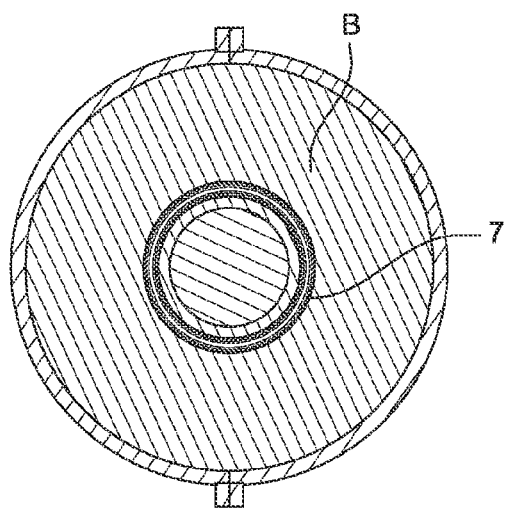
Fig. 2c(L-L)
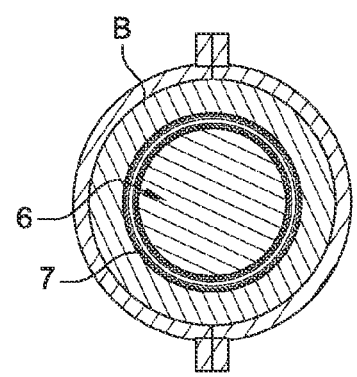
Fig. 2d(J-J)

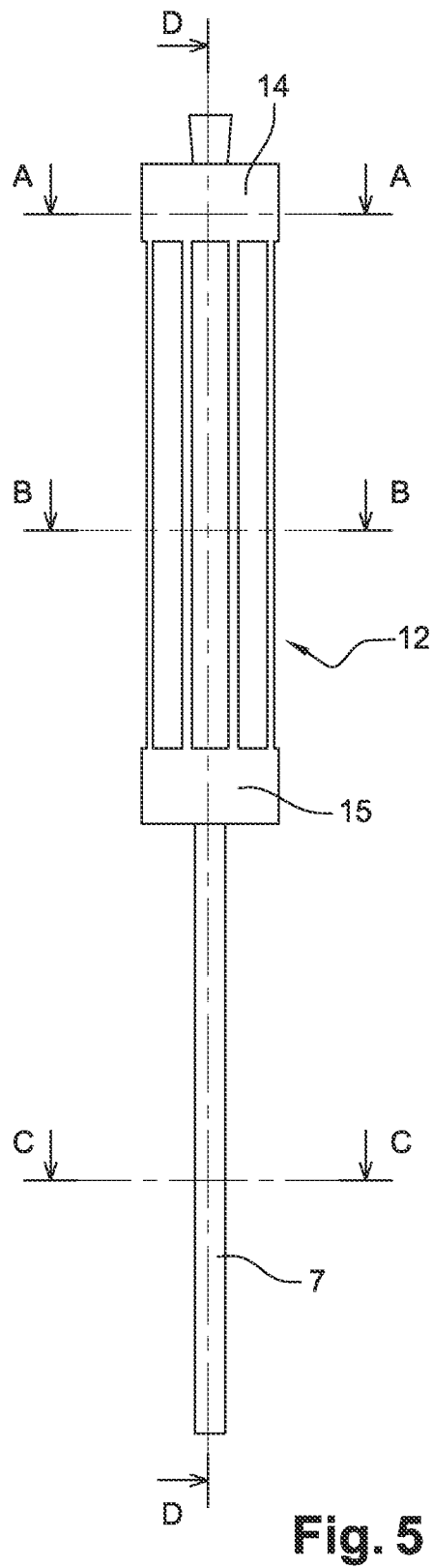
Fig. 5
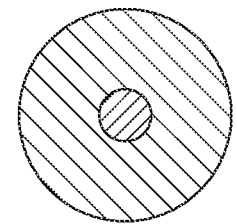
Fig. 6a(A-A)
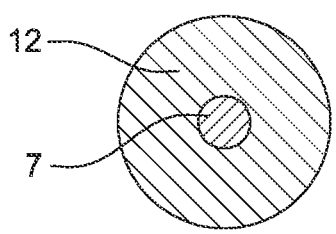
Fig. 6b(B-B)
Fig. 6c(C-C)

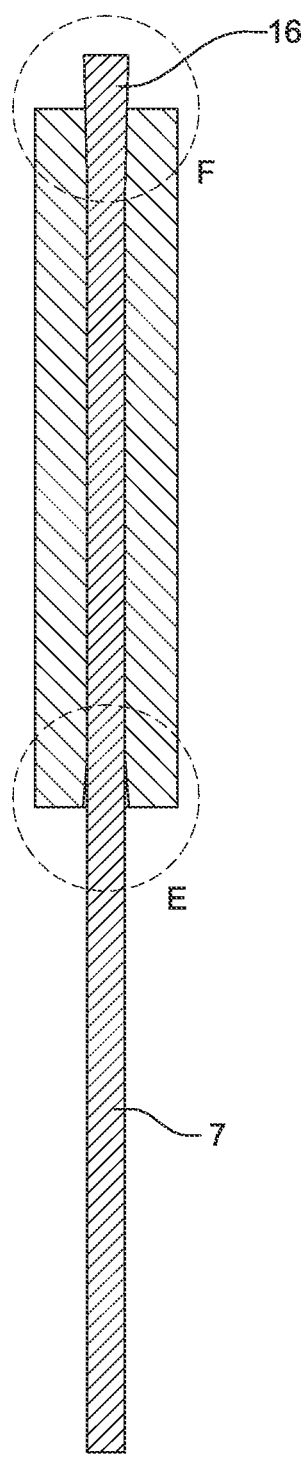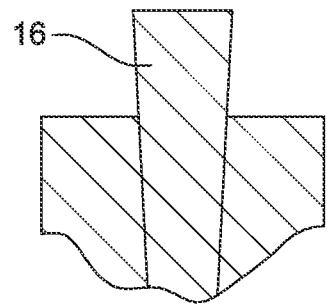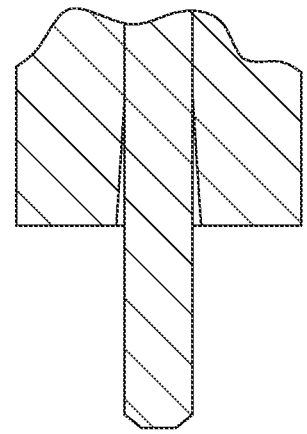
Fig. 7
Fig. 8a(F)
Fig. 8b(E)

ting material is also very rigid, which in turn leads to the possibility of fatigue caused by alternating tension and bending in each of the fibre rods close to said connection. Over a lifespan of 25 years such fatigue may cause slippage of the rods, and consequently an unsecure cable termination.

TERMINATION OF STRENGTH MEMBERS OF DEEP WATER CABLES

RELATED APPLICATION

This application claims the benefit of priority from European Patent Application No. 14306795.7, filed on Nov. 10, 2014, the entirety of which is incorporated by reference.

TECHNICAL FIELD OF THE INVENTION

The present invention concerns the field of cable termination, and more specific, methods for terminating the armoring, such as strength members, of a cable, especially a deep water cable.

BACKGROUND

Cables for subsea use comprise armouring to obtain the required cable strength against tension forces. Such armouring is often provided as strength members in the form of multiple fibre rods, such as carbon fibre rods. Thus, when a cable is to be terminated at one end, the corresponding ends of the armouring must also be securely terminated.

In the prior art, termination of armouring in the form of fibre rods is commonly performed by use of a potting material to secure the end of the fibres in a cable termination. Epoxy resin is a commonly used potting material for fibre rod armouring, such as carbon fibre rods made up of carbon fibres and an epoxy matrix.

A known problem related to the use of epoxy resin as a potting material is its high rigidity. As a consequence, the termination connection between the fibre rods and the potting material is also very rigid, which in turn leads to the possibility of fatigue caused by alternating tension and bending in each of the fibre rods close to said connection. Over a lifespan of 25 years such fatigue may cause slippage of the rods, and consequently an unsecure cable termination.

The present invention provides a method of terminating cables comprising strength members, in the form of multiple rods or wires, which avoids or alleviates at least some of the disadvantages of the prior art. In addition, the present invention also provides a cable termination device suitable for the method of the present invention.

SUMMARY OF THE INVENTION

The present invention is defined in the attached claims and in the following:

In one embodiment, the present invention provides a first method for terminating a cable comprising at least one strength member, the method comprises the steps of:
 providing a cable termination comprising at least one termination chamber for accommodating an end section of the strength member;
 arranging and fastening an anchoring sleeve around at least parts of the end section;
 introducing the end section into the termination chamber; and
 fastening the end section by curing a polymer resin in the termination chamber.

In a further embodiment of the first method according to the invention, the sleeve comprises a first end and a second end, the first end having a conical shape when fastened around the end section, such that fibres at the end section of the strength member may be brushed out in a radial direction.

In a further embodiment of the first method according to the invention, the Shore hardness of the polymer resin in the termination chamber decreases in a stepwise or continuous manner in the longitudinal direction of the strength member towards a cable inlet of the cable termination.

In yet an embodiment, the present invention provides a second method for terminating a cable comprising at least one strength member, the method comprises the steps of:
 providing a cable termination comprising at least one termination chamber for accommodating an end section of the strength member;
 introducing the end section into the termination chamber; and
 fastening the end section by providing and curing a polymer resin in the termination chamber, wherein the Shore hardness of the polymer resin decreases in a stepwise or continuous manner in the longitudinal direction of the strength member towards a cable inlet of the cable termination.

In a further embodiment of the methods according to the invention, the polymer resin with the highest Shore hardness is an epoxy.

In a further embodiment of the methods according to the invention, the polymer resin with the highest Shore hardness is a polyurethane.

In a further embodiment of the methods according to the invention, the termination chamber comprises a first termination section and a second termination section, the second termination section being closer to a cable inlet of the termination and the polymer resin of the highest Shore hardness is arranged in the first termination section.

In a further embodiment of the second method according to the invention, the method comprises a step of arranging and fastening an anchoring sleeve around at least parts of the end section of the strength member.

In a further embodiment of the methods according to the invention, the polymer resin has a Shore D hardness in the range of 35-95.

Preferably, the Shore D hardness of the polymer resin with the highest Shore hardness is in the range of 65-95.

Preferably, the Shore D hardness of the polymer resin with the lowest Shore hardness is in the range of 35-65.

In a further aspect, the invention provides a cable termination device comprising a housing, a termination chamber and an axial through-bore having a cable inlet for a section of whole cable and an outlet for at least parts of the whole cable, the termination chamber surrounds at least a part of the axial through-bore and comprises a first termination section, the first termination section comprising a first wall surface and a second wall surface, the wall surfaces forming an annular space for accommodating strength members radially separated from a cable, wherein the first wall surface and the second wall surface are inclined at an angle $\beta$ and $\alpha$, respectively, the angles being relative to the centerline of the through-bore and the angle $\alpha<\beta$ and $\alpha>0°$.

In one embodiment of the cable termination device according to the invention, the angles $\beta$ and $\alpha$ are such that a cross-sectional area A of the annular space increases in a direction towards the outlet, the cross section being transverse to the centerline of the through-bore.

In a further embodiment of the cable termination device according to the invention the termination chamber comprises a second termination section arranged between the first termination section and the cable inlet, the second termination section comprises a third wall surface forming a space for accommodating a section of whole cable, the third wall surface inclined at an angle □ relative to the centerline of the through-bore.

In a further embodiment of the cable termination device according to the invention, the angle □ is such that a cross-sectional area B of the space for accommodating a section of whole cable increases in a direction towards the outlet, the cross section being transverse to the centerline of the through-bore.

The strength member of the cable may be in any suitable material such as steel or preferably a suitable synthetic polymer or carbon fiber material. Such materials are well known to the skilled person.

DEFINITION OF TERMS

The term "cable termination" is in the present application intended to mean a device used for terminating a cable comprising strength members. The cable termination includes a housing comprising a termination chamber, within which chamber the strength members may be fasten, fixed and/or anchored. The remaining parts of the cable, i.e. conductors, fluid lines etc. is connected as suited after exiting an outlet of the cable termination, or in a section of the cable termination arranged after the termination chamber.

BRIEF DESCRIPTION OF THE DRAWINGS

FIGS. 2a-d are transverse cross-sectional views of the cable termination device in FIG. 1.

FIG. 5 is a side view of the strength member in FIG. 4.

FIGS. 6a-6c are transverse cross-sectional views of the strength member in FIG. 4.

FIG. 7 shows a longitudinal cross-sectional view of the strength member in FIG. 5.

FIGS. 8a and 8b show details of the strength member and the sleeve.

DETAILED DESCRIPTION OF EMBODIMENTS OF THE INVENTION

The present invention concerns a method for obtaining an improved cable termination, and a cable termination device suitable for use in said method. To obtain a required tensile strength, a cable will normally comprise multiple strength members. When such cables are terminated the strength members must be anchored at the termination site to maintain the tensile strength of the whole cable. Such terminations are achieved by use of a cable termination device.

An Embodiment of a Cable Termination Device According to the Present Invention

Figure 1A:
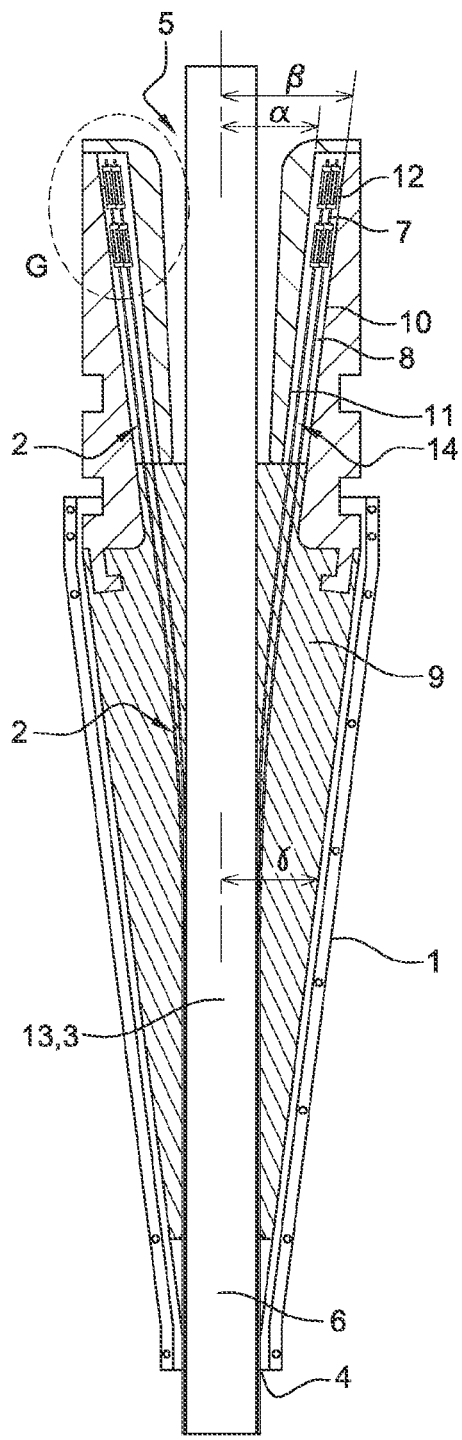
FIGS. 1a-b shows a side view and a longitudinal cross-sectional view of a cable termination device according to the present invention suitable for a method of the present invention.
Figure 1B:
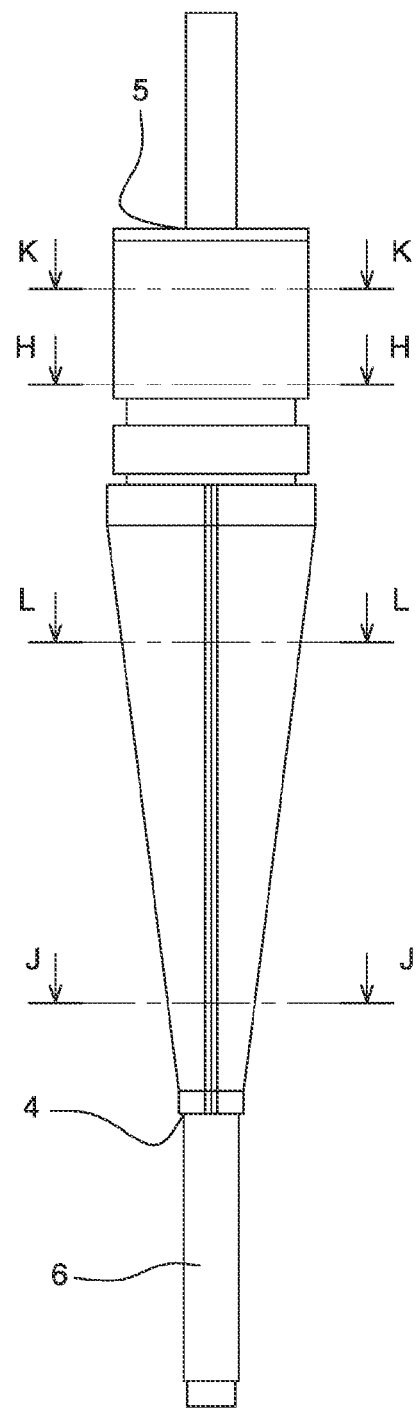
Figure 3G:
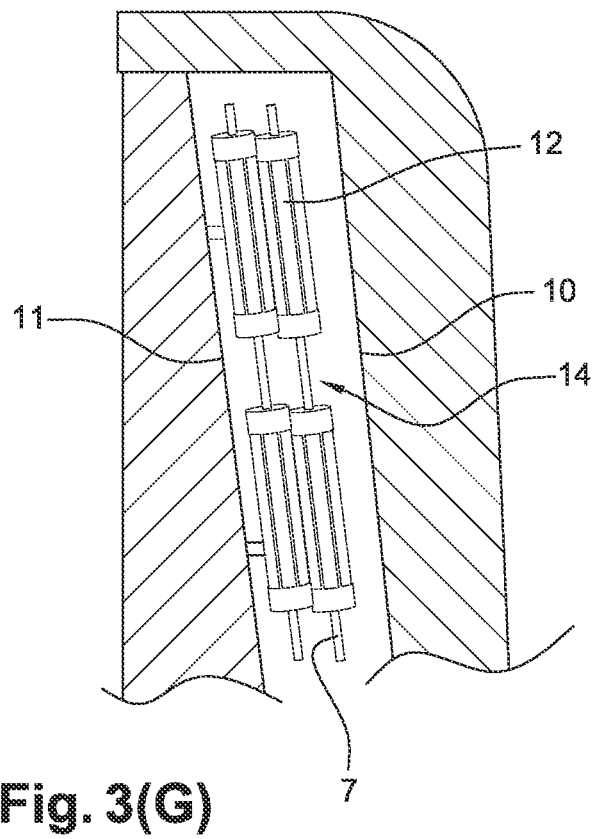
FIG. 3 shows a detail of the first anchoring section of the cable termination device in FIG. 1.
Figure 4:
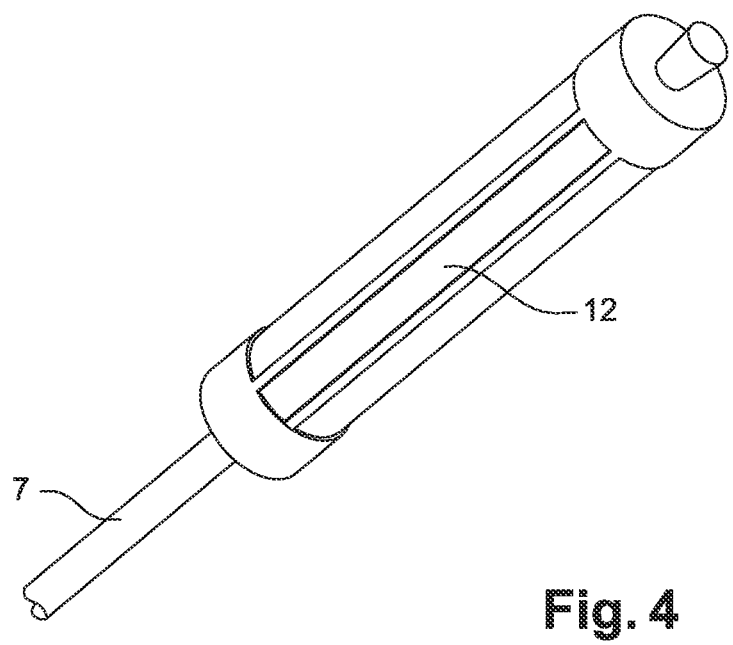
FIG. 4 is a perspective view of a strength member comprising a sleeve.

A cable termination device according to the invention is shown in FIG. 1. The cable termination device comprises a housing 1 surrounding a termination chamber 2 and an axial through-bore 3. The axial through-bore has an inlet 4 and an outlet 5 for a cable 6. The inlet 4 allows entry of the cable 6 to be terminated, and the outlet 5 allows exit of the cable after the strength members 7 have been radially separated from the other cable components. The strength members 7 are anchored or fastened in the termination chamber 2. In the embodiment of FIG. 1, each of the strength members 7 is equipped with an anchorage sleeve 12 at their end section. The termination chamber is made up of a first termination section 8 and a second termination section 9. The first termination section 8 is for fastening/anchoring the strength members 7, while the second termination section 9 is mainly for accommodating and supporting an end section of whole cable 13 including said strength members 7. The first termination section 8 comprises a first wall surface 10 and a second wall surface 11. The first and the second wall surfaces form an annular space 14 around the axial through-bore. The annular space is a part of the termination chamber 2, and is in the form of a truncated cone having its apex in the direction of the cable inlet 4. The second wall surface 11 is inclined at an angle α relative to the centerline of the axial through-bore 3, and the first wall surface 10 is inclined at an angle β relative to the centerline of the axial through-bore 3. The angle α of the second wall surface 11 is lower than the angle β of the first wall surface 10. By having the first wall surface inclined at an angle β relative to the axial through-bore 3, the angle β being higher than the angle α, the area A of the casting volume in a plane perpendicular to the centerline of the axial through-bore will decrease in the direction of the inlet 4, see FIGS. 2a and 2b. By having the second wall surface inclined at an angle α relative to the axial through-bore, the required casting volume (i.e. the space between the inner and first wall surfaces of the first termination section) is reduced while maintaining a decreasing area A, and as a consequence the temperature during curing is also reduced. The effect of the decreasing area is that slippage of the casting mass (i.e. for instance the epoxy resin used to anchor the strength members as described below) is minimized if/when the casting mass is unfixed from the inner and first wall surfaces. The effect is due to an increased pressure in the casting mass when it moves in the direction of the cable inlet 4. The same effect is obtained in the second termination section by having a third wall surface 16 inclined at an angle □.

PRIOR ART

Prior art methods for terminating a cable are in the following described with reference to the cable termination device in FIG. 1. However, said cable termination device is not per se previously disclosed, and comprise features which are considered novel and inventive in view of previously known cable termination devices. Said features are disclosed in detail above.

In the prior art methods for terminating a cable, the strength members 7 are separated from the other cable components for anchoring/fastening in the first termination section 8 without any modification of the end section of the strength member 7. Both the first termination section 8 and the second termination section 9 are then filled with an epoxy resin, followed by curing, to anchor/fasten the strength members and immobilizing an end section of whole cable. The epoxy resin is very rigid, having a high Shore hardness, and alternating bending and tension of the strength members may lead to subsequent slippage. Further, the prior art methods often require the use of a separate bend stiffener connected at the inlet 4 of the cable termination device. The bend stiffener is required to avoid excessive bending near the inlet of the rigid prior art termination.

A First Embodiment of the Method of the Present Invention

In a first embodiment, the present invention provides a cable termination having improved lifespan properties. The improved properties are obtained by modifying the end section of the strength members 7 by use of an anchorage sleeve 12, see FIGS. 4-8. After separating the strength members 7 from the cable, an anchorage sleeve 12 is attached to substantially all of the strength member end sections. The anchorage sleeve 12 is preferably attached by a combination of having a suitable glue (e.g. Loctite 648 or similar) between the inner surface of the anchorage sleeve and the strength member, and mechanical compression (e.g. crimping). The glue will effectively lock the strength member 7 in the anchorage sleeve 12, since the film thickness of the glue is very thin. Breaking tension load of the connection between strength member 7 and anchorage sleeve 12 is close to the breaking load of the strength member 7 itself. In addition, the strength member may be further secured by having an anchorage sleeve 12 comprising a conical end 13 at which fibres of the strength member may be brushed out. The use of an anchorage sleeve at the end of the strength members 7 provide an improved durability of the cable termination, since such a termination is much less susceptible to slippage of the strength members 7 due to alternating tension and bending of said members. The anchorage sleeves provide a "second barrier" towards slippage as compared to non-modified strength members.

A Second Embodiment of the Method of the Present Invention

In a second embodiment, the present invention also provides a cable termination having improved lifespan properties. This embodiment does not require an anchorage sleeve 12 at the end sections of the strength members 7. As described above, in the prior art methods, using epoxy resin for anchoring both strength members 7 and an end section of whole cable 13, the strength members 7 may be susceptible to slippage due to alternating tension and bending of said members. Use of a bend stiffener at the inlet 4 may alleviate some of the fatigue inducing strain. In the second embodiment of the invention, the anchoring of the strength members 7 and the immobilization of an end section of whole cable 13 is performed using polymer resins of varying Shore hardness. The Shore hardness is measured according to ASTM D2240. In all aspects of the second embodiment, the resin having the highest Shore hardness is used to anchor the end section of the strength members 7, while the resin having the lowest Shore hardness is used to immobilize the end section of whole cable 13 closest to the inlet of the cable termination. The Shore hardness of the resin(s) may be varied in a continuous or stepwise manner. For instance, epoxy or polyurethane (PU) resin having a Shore D hardness in a typical range of 65-95 may be used for anchoring the strength members 7 in the first termination section 8, while an epoxy or polyurethane resin(s) having a Shore D hardness in a typical range of 35-65 may be used for anchoring the end section of whole cable 13 in the second termination section 9. In one alternative, both the strength members and the end section of whole cable may be anchored by use of different PU resins. In that case a PU resin of high Shore hardness is used for anchoring the strength members, while PU of comparatively lower Shore hardness is used for immobilizing the end section of whole cable. Use of a less hard resin at the end section of whole cable provides a more flexible and fatigue resistant transition between the cable and the termination. When measuring the Shore hardness of polymer resins, various scales may be used depending on the properties of the resins. In the present disclosure, when a certain resin is described as having a higher Shore hardness than another, both resins are preferably measured by using the same Shore hardness scale, for instance type A or D. However in some instances the differences in hardness are such that the same hardness scale is not suitable for both resins. For instance, the Shore hardness of an epoxy may be measured using the type D scale (suitable for hard polymers), while the Shore hardness of a polyurethane may in some cases also be measured using the type A scale (suitable for softer polymers). In the latter case, the skilled person will easily recognize the resin having the highest hardness, even if the Shore D value of the epoxy may be lower than the Shore A value of the polyurethane.

A Third Embodiment of the Method of the Present Invention

In a third embodiment, the present invention provides a cable termination comprising the features of both the first and the second embodiment of the invention as described above. In this embodiment, the end section of the strength members 7 is first modified by use of an anchorage sleeve 12 as described above. The strength members of the cable is further anchored in the first termination section 8, and a section of whole cable immobilized in the second termination section 9, as described in connection with the second embodiment, i.e. by using polymer resins of varying Shore hardness.

In the specific embodiment shown in FIG. 1, the strength member is a carbon fiber rod, but the strength member may also be made of other materials having a high elongation modulus and low weight/tensile strength ratio.

The invention claimed is:

1. A method for terminating a cable having at least one strength member, the method comprises the steps of:
   providing a cable termination comprising at least one termination chamber for accommodating an end section of the strength member;
   arranging and fastening an anchoring sleeve around at least parts of the end section, the sleeve further comprising a first end and a second end, the first end having a conical shape when fastened around the end section, such that fibres at the end section of the strength member may be brushed out in a radial direction;
   introducing the end section into the termination chamber; and
   fastening the end section by curing a polymer resin in the termination chamber.

2. A method according to claim 1, wherein the Shore hardness of the polymer resin in the termination chamber decreases in a stepwise or continuous manner in the longitudinal direction of the strength member towards a cable inlet of the cable termination.

3. A method according to claim 2, wherein the polymer resin with the highest Shore hardness is an epoxy.

4. A method according to claim 2, wherein the polymer resin with the highest Shore hardness is a polyurethane.

5. A method according to claim 2, wherein the polymer resin comprises multiple types of polyurethanes and/or epoxies of decreasing Shore hardness.

6. A method according to claim 2, wherein the termination chamber further comprises a first termination section and a second termination section, the second termination section being closer to a cable inlet of the termination and the polymer resin of the highest Shore hardness is arranged in the first termination section.

7. A method according to claim 1, wherein the polymer resin has a Shore D hardness in the range of 35-95.

8. A method for terminating a cable having at least one strength member, the method comprises the steps of:
providing a cable termination comprising at least one termination chamber for accommodating an end section of the strength member;
introducing the end section into the termination chamber; and
fastening the end section by providing and curing a polymer resin in the termination chamber, wherein the Shore hardness of the polymer resin decreases in a stepwise or continuous manner in the longitudinal direction of the strength member towards a cable inlet (4) of the cable termination.

9. A method according to claim 8, wherein the polymer resin with the highest Shore hardness is an epoxy.

10. A method according to claim 8, wherein the polymer resin with the highest Shore hardness is a polyurethane.

11. A method according to claim 8, wherein the polymer resin comprises multiple types of polyurethanes and/or epoxies of decreasing Shore hardness.

12. A method according to claim 8, wherein the termination chamber further comprises a first termination section and a second termination section, the second termination section being closer to a cable inlet of the termination and the polymer resin of the highest Shore hardness is arranged in the first termination section.

13. A method according to claim 8, further comprising a step of arranging and fastening an anchoring sleeve around at least parts of the end section of the strength member.

14. A method according to claim 8, wherein the polymer resin has a Shore D hardness in the range of 35-95.

\* \* \* \* \*